US006588828B2

(12) United States Patent
Fisher

(10) Patent No.: US 6,588,828 B2
(45) Date of Patent: Jul. 8, 2003

(54) VEHICLE APERTURE CLOSURE DRIVE SYSTEM

(75) Inventor: Sidney Edward Fisher, Shirley (GB)

(73) Assignee: Meritor Light Vehicle Systems (UK) Limited, Birmingham (GB)

( * ) Notice: Subject to any disclaimer, the term of this patent is extended or adjusted under 35 U.S.C. 154(b) by 0 days.

(21) Appl. No.: 09/843,237

(22) Filed: Apr. 25, 2001

(65) Prior Publication Data

US 2001/0050496 A1 Dec. 13, 2001

(30) Foreign Application Priority Data

Apr. 25, 2000 (GB) ............................................ 0009792

(51) Int. Cl.$^7$ ............................ B60J 5/04; F16H 29/12

(52) U.S. Cl. ..................... 296/146.4; 49/502; 74/89.38; 74/665 L

(58) Field of Search ................................ 296/117, 155, 296/146.4; 49/502, 49; 74/89.38, 665 L

(56) References Cited

U.S. PATENT DOCUMENTS

| | | | | | |
|---|---|---|---|---|---|
| 2,576,816 A | * | 11/1951 | Wahlberg | ................... | 180/289 |
| 3,742,646 A | * | 7/1973 | Piech | ............................ | 49/28 |
| 3,933,059 A | * | 1/1976 | Houck | ...................... | 74/665 L |
| 4,930,255 A | | 6/1990 | Sea | | |
| 5,009,296 A | * | 4/1991 | Ohkawa et al. | ........... | 74/665 F |
| 5,378,036 A | * | 1/1995 | Townsend | ..................... | 49/358 |
| 5,524,960 A | * | 6/1996 | Townsend | ................... | 296/155 |
| 5,688,019 A | * | 11/1997 | Townsend | ................... | 296/155 |
| 5,913,563 A | * | 6/1999 | Watanabe et al. | ........... | 296/155 |
| 5,918,926 A | * | 7/1999 | Townsend | ................ | 296/146.4 |
| 5,920,159 A | * | 7/1999 | Miller et al. | .................. | 49/502 |
| 6,000,077 A | * | 12/1999 | Cyr | .......................... | 74/665 F |
| 6,109,124 A | * | 8/2000 | Chen | .......................... | 74/89.15 |
| 6,150,781 A | * | 11/2000 | Hollerbach | ................. | 296/117 |

FOREIGN PATENT DOCUMENTS

| | | |
|---|---|---|
| DE | 3807087 A | 9/1989 |
| DE | 19755942 A | 10/1999 |
| EP | 0 078 662 A2 | 10/1982 |
| GB | 2 095 324 A | 9/1982 |

OTHER PUBLICATIONS

Search Report dated Jun. 27, 2000.

* cited by examiner

*Primary Examiner*—D. Glenn Dayoan
*Assistant Examiner*—Hilary Gutman
(74) *Attorney, Agent, or Firm*—Carlson, Gaskey & Olds

(57) ABSTRACT

A drive system (10) operable to drive vehicle door functions comprises a drive member (20) mounted for rotation about a drive axis by a drive motor (12), a rocker (24) operable by the drive member (20), and translation means (16), (18), (22) operable to move the drive member (20) to a predetermined position on the drive axis.

27 Claims, 4 Drawing Sheets

VEHICLE APERTURE CLOSURE DRIVE SYSTEM

This application claims priority to British Application Number GB0009792.3 filed on Apr. 25, 2000.

BACKGROUND OF THE INVENTION

The present invention relates to the provision of arcuate drive means within a motor vehicle aperture closure such as a vehicle side passenger door, boot lid, sun roof and the like.

It is increasingly common for motor vehicles to be provided with electric motors housed within the door assemblies thereof. Typically a vehicle door may be provided with a motor adapted to raise and lower a window glass panel, a motor to drive central locking means of the door, and a further motor to enable security locking or deadlocking of the door. More expensive vehicles may have doors provided with additional motors to enable, for example, automatic closing thereof.

The plurality of motors described above increases both the weight and complexity of a door and a corresponding increases manufacturing costs.

SUMMARY OF INVENTION

According to the present invention there is provided a drive system operable to drive vehicle aperture closure functions comprising a drive actuator operably connected to a drive member, the drive member having at least first and second positions and being movable between the first and second positions, operation of the drive actuator when the drive member is in the first position causing operation of an aperture closure function.

BRIEF DESCRIPTION OF THE DRAWINGS

An embodiment of the present invention will now be described with reference to the accompanying drawings in which.

DETAILED DESCRIPTION OF THE PREFERRED EMBODIMENT

Figure 1:
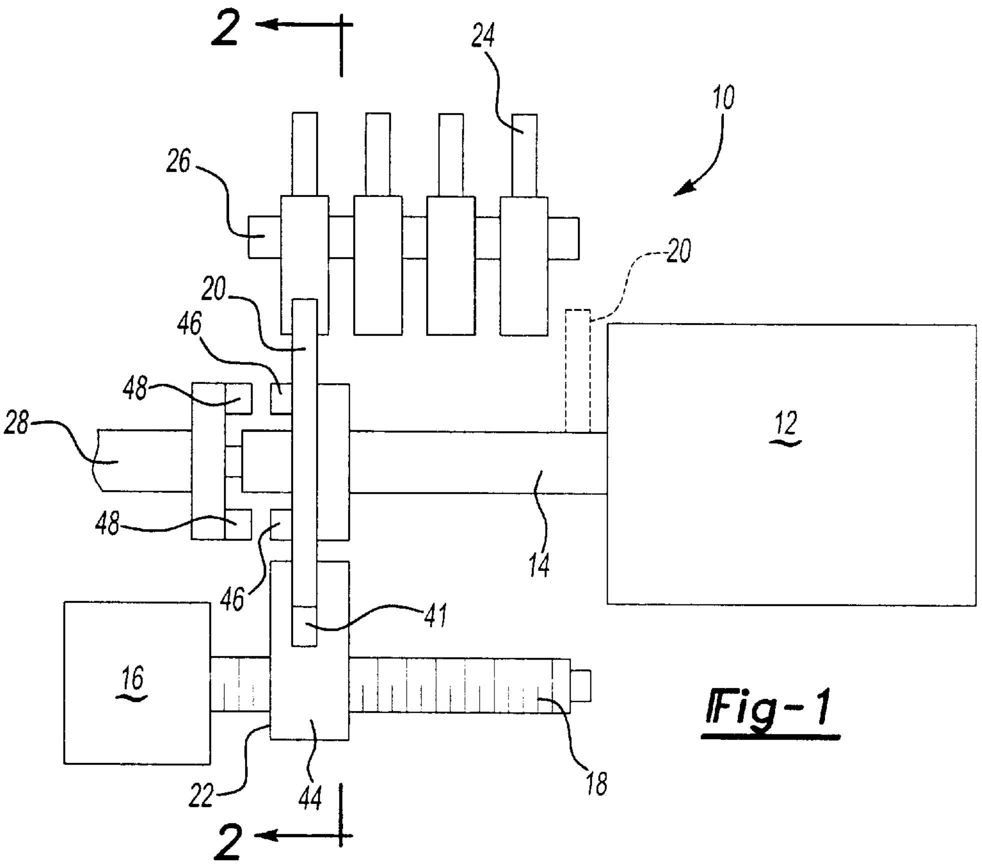
FIG. 1 shows a diagrammatic plan view of a drive system according to the present invention.
Figure 2:
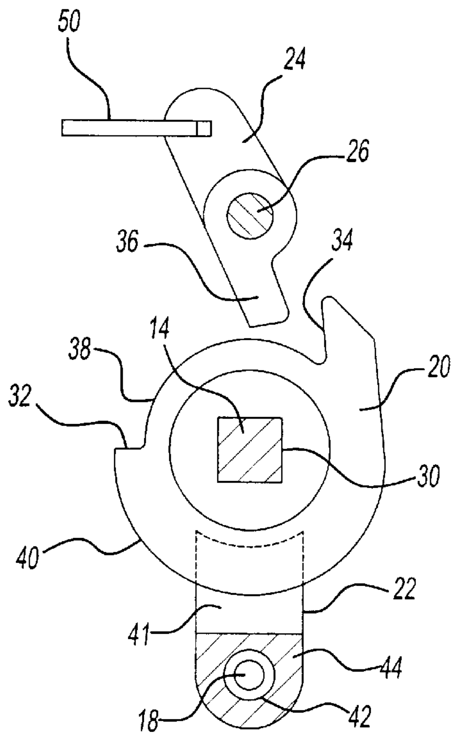
FIG. 2 shows the cross-sectional view indicated by arrows 2—2 in FIG. 1. Image Page 2

Referring to FIGS. 1 and 2 there is shown a drive system, generally designated 10 for a vehicle door assembly. The drive system 10 comprises a drive actuator in the form of a main motor 12 having a drive shaft 14 extending therefrom, a stepper motor 16 having a threaded shaft 18 extending therefrom, a drive member 20 slidably mounted on the drive shaft 14, and a yoke 22 mounted on the threaded shaft 18. The drive system 10 further includes a plurality of rockers

24 pivotably mounted to a rocker shaft 26 and a window regulator shaft 28 provided substantially co-axially with respect to the drive shaft 14. The rockers 26 are movable to operate door functions, such as locking functions, via link members 50. The main motor 12 and stepper motor 16 are electric motors.

The stepper motor 16, threaded shaft 18 and yoke 22 together form a selector actuator.

As can be seen from FIG. 2, the drive shaft 14 is substantially square in cross-section and is received in a correspondingly shaped aperture 30 of the drive member 20. The drive member 20 has the general form of a disc and is provided with abutment surfaces 32, 34 adapted to, in use, engage an engagement portion 36 of respective rockers 24. In the embodiment shown the abutment surfaces 32, 34 are defined at opposing sides of a recessed portion 38 of the peripheral edge 40 of the drive member 20.

The yoke 22 is provided with a slot 41 within which the drive member 20 is received. A threaded aperture 42 in the base 44 of the yoke 22 is adapted to receive the threaded shaft 18 and hence enable the yoke 22 to be driven by the stepper motor 16.

The drive member 20 is further provided with drive teeth 46 which are adapted to engage corresponding drive teeth 48 provided on the window regulator shaft 28.

Operation of the drive system 10 is as follows. The stepper motor 16 is operated to rotate the threaded shaft 18 and, via the threaded connection therebetween, move the yoke 22 with respect to the threaded shaft 18. Movement of the yoke 22 results in corresponding movement of the drive member 20 relative to the drive shaft. Taking the example where it is desired to carry out a locking function via one of the rockers 24, the stepper motor 16 is operated to move the drive member 20 into position relative to the appropriate rocker 24. Once in position the stepper motor 16 ceases operation so as to maintain the drive member 20 in the correct position with respect to the rocker 24.

The drive motor 12 is then operated to rotate the drive shaft 14 and drive member 20 and move one of the drive member abutment surfaces 34, 32 into engagement with the rocker engagement portion 36. Continued rotation of the drive member 20 causes pivotal movement of the rocker 24 about the rocker shaft 26 and hence executes the locking function.

Alternatively the drive system 10 may be operated so as to raise or lower a window. In such an operative mode, the stepper motor 16 is driven so as to move the drive teeth 46 of the drive member 20 into engagement with the drive teeth 48 of the window regulator shaft 28. Once these teeth 46, 48 are engaged the drive motor 12 is operated to rotate the window regulator shaft 28.

Furthermore it is possible to provide a neutral position of the drive system. Such a position is shown in FIG. 1 wherein the drive member (shown dotted) is positioned adjacent the drive motor such that operation of the drive motor does not cause operation of any door function. Such a position can usefully be included to provided additional safety features such that inadvertent operation of the drive motor 12 does not, for example, cause opening or unlocking of a door.

In further embodiments stepper motor 16 can be replaced by a DC motor or any other suitable power source. In particular where the motor is a DC motor it is advantageous for the drive member 20 to only have a first and second position.

Figure 1A:
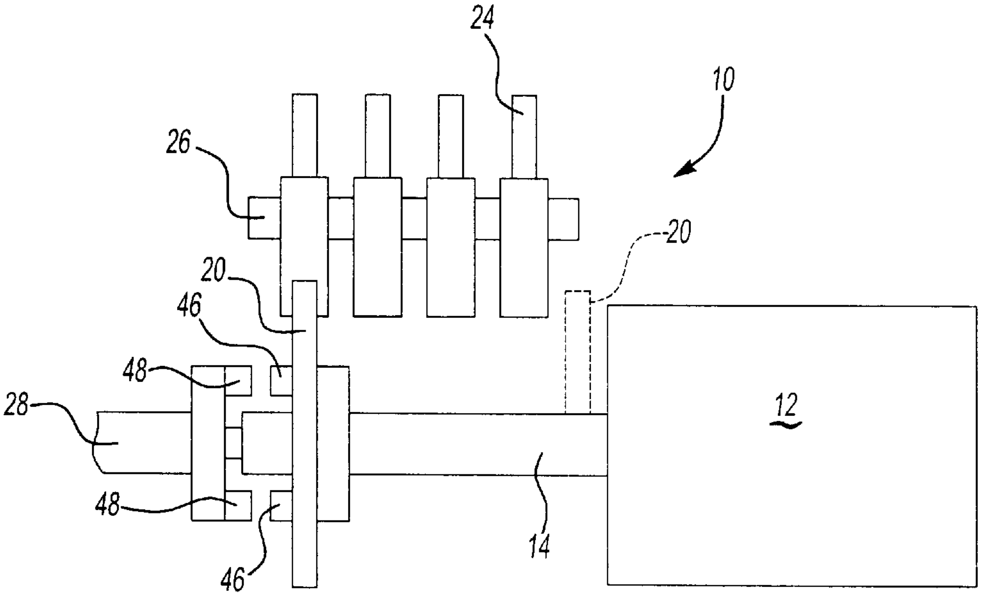
FIG. 1A shows diagrammatic plan view of another drive system according to the present invention.

As shown in FIG. 1A, in further embodiments it is not necessary to provide the selector actuator (i.e., stepper motor 16, threaded shaft 18 and yolk 22) since this function can be performed manually. Such an arrangement is particularly advantageous where only a limited number of door functions are required to be performed by the drive actuator for example where the drive actuator operates raising and lowering of a window glass and also operates to close and/or release the door.

In a further embodiment the selector actuator may be arranged to move the drive actuator and the drive member together as a whole.

Figure 3:
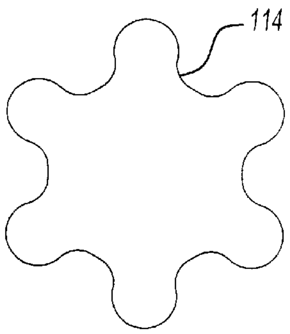
FIG. 3 shows an alternative cross-sectional profile for a driveshaft for use in the embodiment shown in FIG. 1.

FIG. 3 shows an alternative cross-section profile for a driveshaft 114 for use in the embodiment shown in FIG. 1. In is case drive shaft 114 is of the Torques™ profile being smoothly contoured and multilobed.

Figure 4:
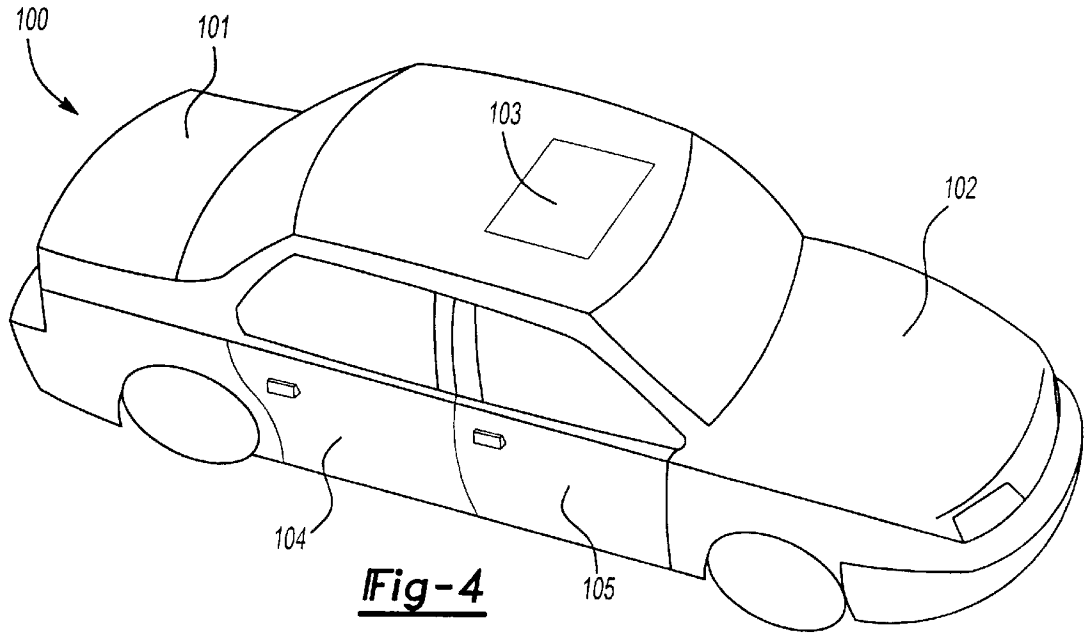
FIG. 4 shows a schematic isometric view of a vehicle including a drive system according to the present invention.

FIG. 4 shows a vehicle 100 including various aperture closures, in particular hood 101, trunk 102, sunroof 103, front side passenger door 104 and rear side passenger door 105. Passenger doors 104 and 105 are pivotally mounted, in this case at a front edge. The aperture closures can include a drive system according to the present invention.

Figure 5:
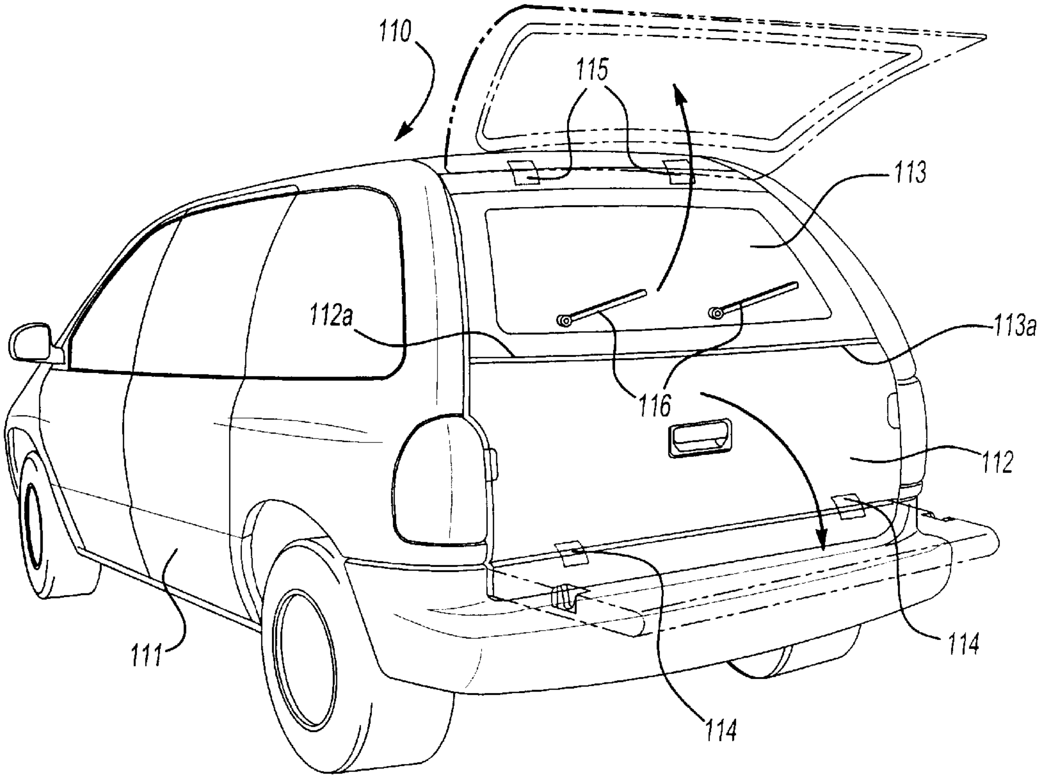
FIG. 5 shows an isometric schematic view of a further vehicle including a drive system according to the present invention.

FIG. 5 shows a vehicle 110 with various aperture closures, in particular a side passenger door 111 which slides to open, a tailgate 112 and a rear window 113.

Sliding door 111 includes a drive system according to the present invention.

Tailgate 112 can be pivoted downwards about pivots 114 and rear window 113 can be pivoted upwards about pivots 115. In particular it can be seen that the window 113 has a lower edge 113A which closes against an upper edge 112A of tailgate 112. A drive system according to the present invention is mounted in tailgate 112 and interacts with rear window 113. In particular the drive system in tailgate 112 can be used to lock rear window 113 in a closed position. Alternatively or additionally the drive system mounted in tailgate 112 can be used to drive wiper blade 116, which is mounted on rear window 113. Alternatively or additionally the drive system mounted in tailgate 112 can be used to power a washer pump also mounted on tailgate 112 which squirts water onto rear window 113.

It can be seen that in this case the function provided by the drive system on tailgate 112 interacts with the adjacent rear window 113.

Figure 6:
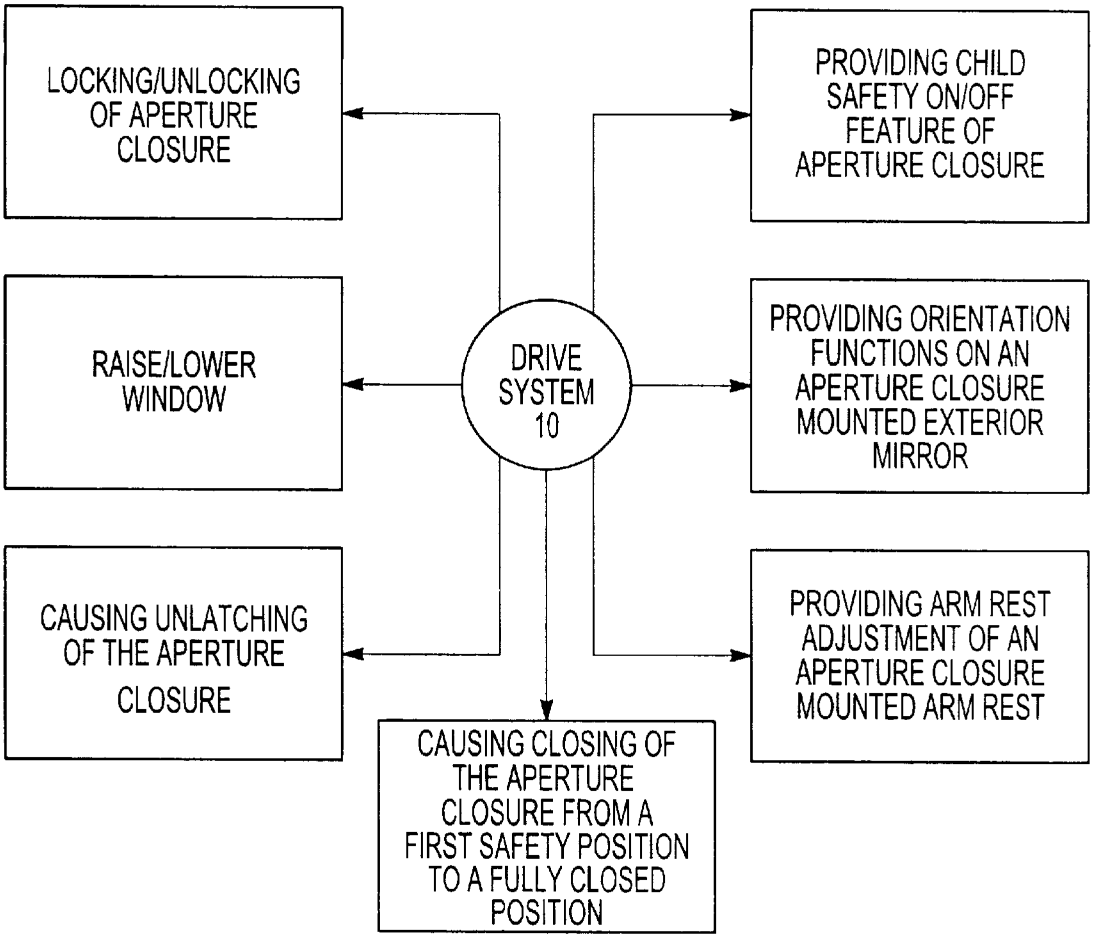
FIG. 6 shows functions of a drive system according to the present invention.

FIG. 6 shows schematically functions actuable with drive system 10.

What is claimed is:

1. A drive system operable to drive a vehicle aperture closure function comprising a drive actuator operably connected to a drive member, the drive member having at least first and second positions and being movable between the first and second positions, an operation of the drive actuator when the drive member is in the first position causing an operation of the vehicle aperture closure function in which the vehicle aperture closure function is at least one of:

a) locking/unlocking of a vehicle aperture closure;

b) providing child safety on/off feature of the vehicle aperture closure;

c) providing orientation functions on a vehicle aperture closure mounted exterior mirror;

d) causing unlatching of the vehicle aperture closure;

e) causing closing of the vehicle aperture closure from a first safety position to a fully closed position; and f) providing arm rest adjustment of a vehicle aperture closure mounted arm rest.

2. A drive system as claimed in claim 1 in which the operation of the drive actuator when the drive member is in the second position causes an operation of a further vehicle aperture closure function.

3. A drive system as claimed in claim 1 in which the operation of the drive actuator when the drive member is in the second position prevents the operation of the vehicle aperture closure function.

4. A drive system as claimed in claim 1 in which the vehicle aperture closure function moves a window.

5. A drive system as claimed in claim 1 in which the drive member is manually movable between the first and second positions.

6. A drive system as claimed in claim 1 in which the drive member is movable between the first and second positions by a selector actuator.

7. A drive system as claimed in claim 6 wherein the drive member is slidably mounted on a drive shaft of the drive actuator and the selector actuator is operable to move the drive member along the drive shaft.

8. A drive system as claimed in claim 7 wherein the drive shaft is shaped so as to be able to transmit rotational movement to the drive member while permitting the drive member to slide thereupon.

9. A drive system as claimed in claim 8 wherein the driveshaft is non-circular in cross section and is received as a sliding fit in a correspondingly shaped aperture of the drive member.

10. A drive system as claimed in claim 6 wherein the selector actuator comprises a yoke adapted to bear against the drive member, and a motor operable to move the yoke along a path substantially parallel an axis of the drive shaft.

11. A drive system as claimed in claim 10 wherein the motor comprises a motor having a rotatable drive motor shaft extending therefrom.

12. A drive system as claimed in claim 11 wherein the drive motor shaft is threaded and received in a correspondingly threaded aperture of the yoke.

13. A drive system according to claim 1 in which the vehicle aperture closure is one of a pivoting passenger door, sliding passenger door, trunk, tailgate, hood and sun roof.

14. A drive system operable to drive at least two vehicle aperture closure functions comprising a drive actuator operably connected to a single drive member, the drive member having at least first and second positions and being movable between the first and second positions, an operation of the drive actuator when the drive member is in the first position causing an operation of one of the at least two vehicle aperture closure functions and in which the operation of the drive actuator when the drive member is in the second position causes an operation of another of the at least two vehicle aperture closure functions.

15. A drive system as claimed in claim 14 in which the drive member is movable between the first and second positions by a selector actuator.

16. A drive system as claimed in claim 15 wherein the drive member is slidably mounted on a drive shaft of the drive actuator and the selector actuator is operable to move the drive member along the drive shaft.

17. A drive system as claimed in claim 16 wherein the drive shaft is shaped so as to be able to transmit rotational movement to the drive member while permitting the drive member to slide thereupon.

18. A drive system as claimed in claim 17 wherein the drive shaft is non-circular in cross section and is received as a sliding fit in a correspondingly shaped aperture of the drive member.

19. A drive system as claimed in claim 15 wherein the selector actuator comprises a yoke adapted to bear against the drive member, and a motor operable to move the yoke along a path substantially parallel an axis of the drive shaft.

20. A drive system as claimed in claim 19 wherein the motor comprises a motor having a rotatable drive motor shaft extending therefrom.

21. A drive system as claimed in claim 20 wherein the drive motor shaft is threaded and received in a correspondingly threaded aperture of the yoke.

22. A drive system according to claim 14 in which the one of the at least two vehicle aperture closure functions comprises at least one of a pivoting passenger door, sliding passenger door, trunk tailgate, hood and sun roof.

23. A drive system as claimed in claim 14 in which the operation of the drive actuator when the drive member is in the second position disables the operation of the one of the at least two vehicle aperture closure functions.

24. A drive system as claimed in claim 14 in which the one of the at least two vehicle aperture closure functions moves a window.

25. A drive system as claim in claim 14 in which the one of the at least two vehicle aperture closure functions comprises:

a) locking/unlocking a vehicle aperture closure;

b) providing child safety on/off feature of the vehicle aperture closure;

c) providing orientation functions on a vehicle aperture closure mounted exterior mirror;

d) causing unlatching of the vehicle aperture closure;

e) causing closing of the vehicle aperture closure from a first safety position to a fully closed position; and f) providing arm rest adjustment of a vehicle aperture closure mounted arm rest.

26. A drive system as claimed in claim 14 in which the drive member is manually movable between the first and second positions.

27. A drive system as claimed in claim 26 in which the one of the least two vehicle aperture closure functions is movement of a window.

* * * * *

UNITED STATES PATENT AND TRADEMARK OFFICE

CERTIFICATE OF CORRECTION

PATENT NO. : 6,588,828 B2
DATED : July 8, 2003
INVENTOR(S) : Sidney Edward Fisher It is certified that error appears in the above-identified patent and that said Letters Patent is hereby corrected as shown below:

Column 5,
Line 20, "claim" should be -- claimed --.

Column 6,
Line 19, should read as follows: -- of the at least two vehicle aperture closure functions is movement --

Signed and Sealed this

Sixteenth Day of December, 2003

JAMES E. ROGAN
*Director of the United States Patent and Trademark Office*